G. W. RICE.
MOTOR VEHICLE STEERING MECHANISM.
APPLICATION FILED NOV. 18, 1915.
1,173,034.
Patented Feb. 22, 1916.
2 SHEETS—SHEET 1.
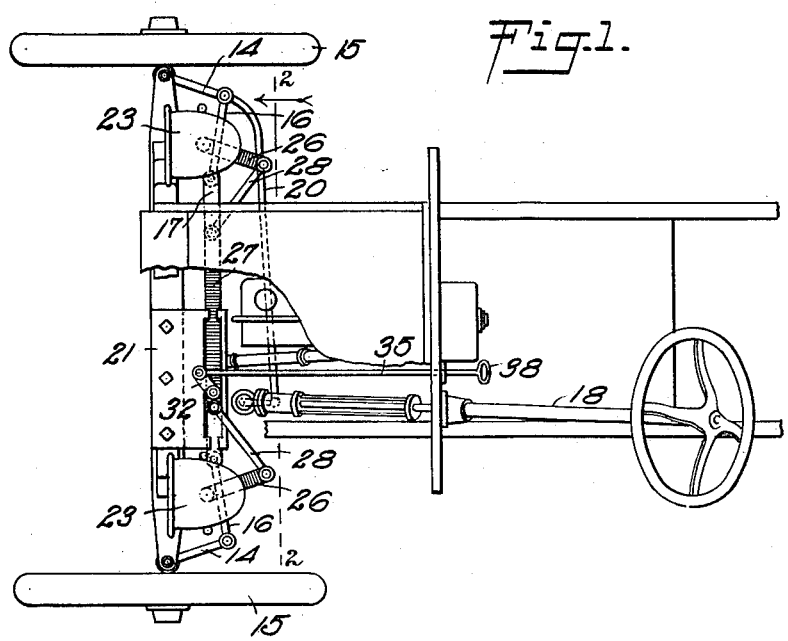
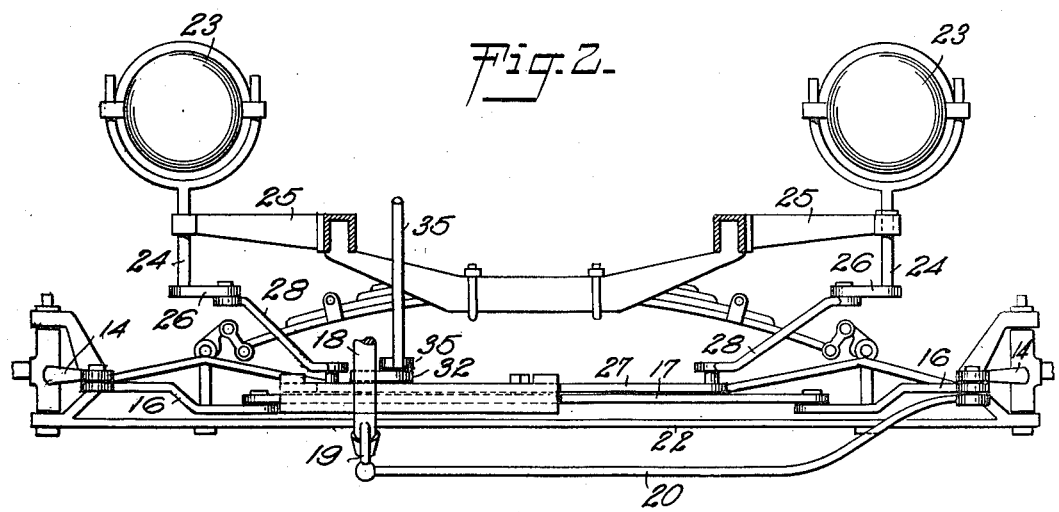
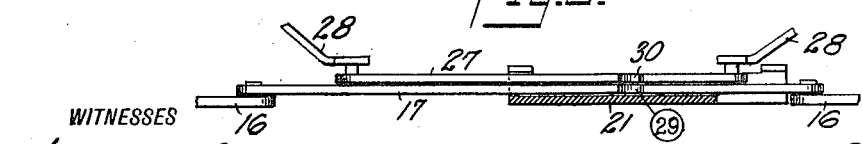
WITNESSES
INVENTOR
G. W. Rice
BY
ATTORNEYS G. W. RICE.
MOTOR VEHICLE STEERING MECHANISM.
APPLICATION FILED NOV. 18, 1915.
1,173,034.
Patented Feb. 22, 1916.
2 SHEETS—SHEET 2.
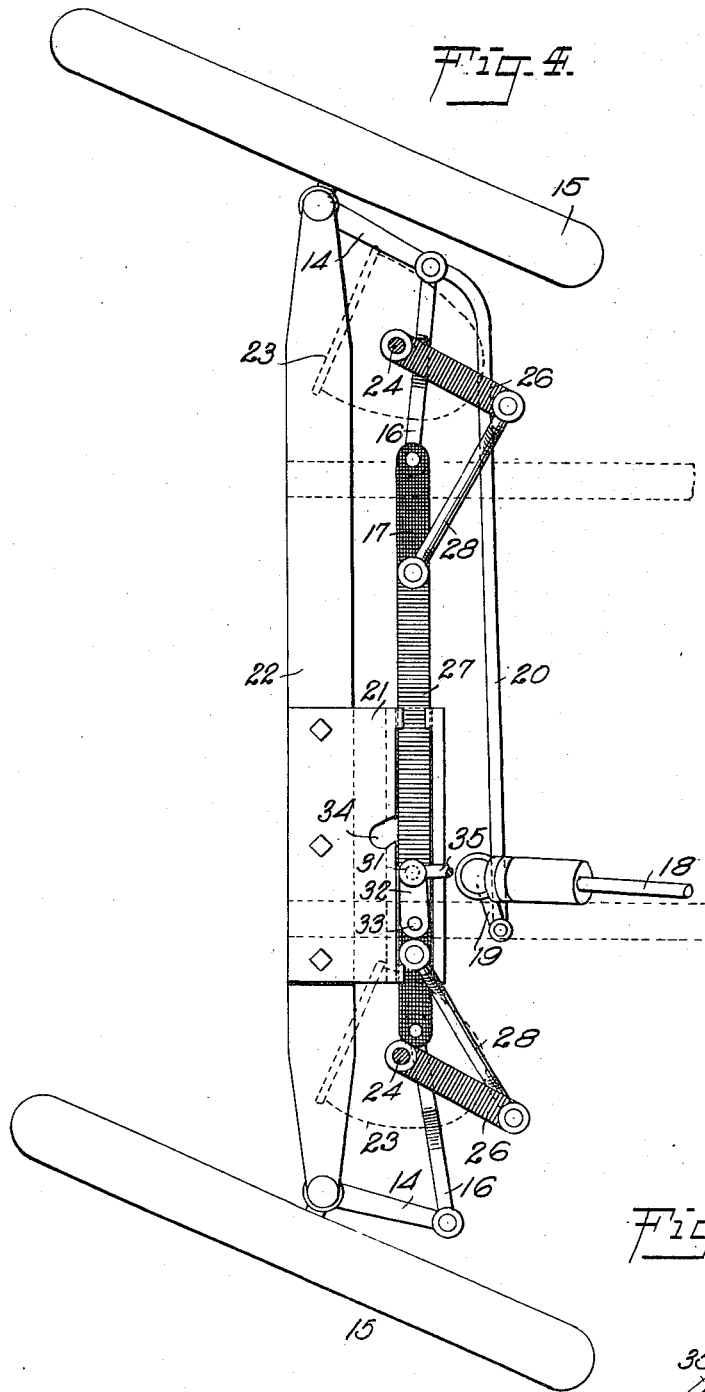
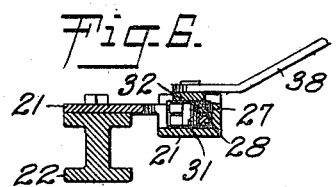
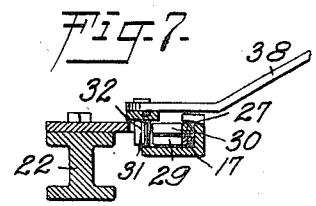
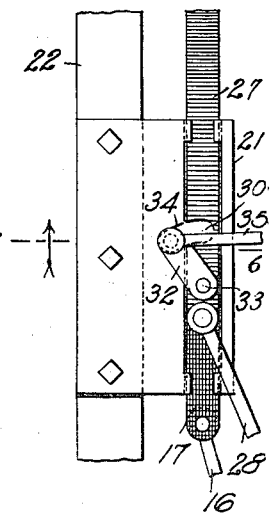
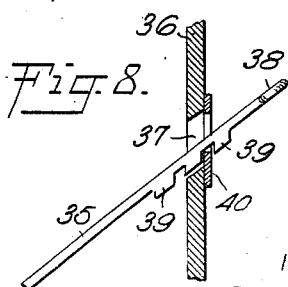
WITNESSES
INVENTOR
G. W. Rice
BY
ATTORNEYS

UNITED STATES PATENT OFFICE.

GEORGE WASHINGTON RICE, OF MANISTIQUE, MICHIGAN, ASSIGNOR OF ONE-HALF TO EDWARD W. MILLER, OF MANISTIQUE, MICHIGAN.

MOTOR-VEHICLE STEERING MECHANISM.

1,173,034.    Specification of Letters Patent.    Patented Feb. 22, 1916.

Application filed November 18, 1915.   Serial No. 62,127.

*To all whom it may concern:*

Be it known that I, GEORGE W. RICE, a citizen of the United States, and a resident of Manistique, in the county of Schoolcraft and State of Michigan, have invented a new and Improved Motor-Vehicle Steering Mechanism, of which the following is a full, clear, and exact description.

Among the principal objects which the present invention has in view are: to provide means for manipulating the headlights of a vehicle in correspondence with the steering mechanism of the vehicle; and to provide means for, at will, suspending said manipulation of the headlights.

*Drawings.*—Figure 1 is a top plan view of a front fragment of a motor vehicle showing the steering wheels and mechanism controlling the same, and in conjunction therewith a headlight-controlling mechanism constructed and arranged in accordance with the present invention; Fig. 2 is a section taken as on the line 2—2 in Fig. 1, the same being shown on an enlarged scale; Fig. 3 is a detail view on an enlarged scale, showing the tie-rod of a motor vehicle wheel-steering gear, and in conjunction therewith, an auxiliary tie-rod of the lamp-steering gear; Fig. 4 is a top plan view on an enlarged scale of a front vehicle axle carrying wheels and wheel-steering gear therefor, and in conjunction therewith, a lamp-steering gear constructed and arranged in accordance with the present invention; Fig. 5 is a detail view showing a fragment of the wheel-steering gear and the lamp-steering gear, and means employed for holding the latter in fixed position; Fig. 6 is a cross section taken as on the line 6—6 in Fig. 5, showing the tie-rods above mentioned united in service relation; Fig. 7 is a similar view showing the tie-rods as operatively disconnected; Fig. 8 is a detail view showing a fragment of the controlling mechanism for connecting and disconnecting the tie-rods of the wheel and lamp steering gears.

*Description.*—As seen in the drawings, the steering knuckles 14, supported by the steering wheels 15, are operatively connected, by means of link bars 16, with a tie-rod 17. One of the knuckles 14 is operatively connected with a steering rod 18 and with the knuckles 19 thereof, by means of a drag bar 20 of conventional form and construction.

The tie-rod 17 when constructed in accordance with the present invention, is made from metal, preferably rectangular in cross section, to fit a groove formed in the bracket plate 21. The plate 21 is rigidly secured to the vehicle axle 22 by suitable means, and extends rearwardly therefrom. The groove formed in the plate 21 guides the rod 17 to move in a line parallel with said axle.

In the present invention, the lamps 23, forming what is herein termed the headlights, are mounted on pivot posts 24. The posts 24 are pivotally mounted in brackets 25, as seen best in Fig. 2 of the drawings, and are furnished at their lower ends with reach bars 26. The reach bars 26 are flexibly connected by links 28, with the auxiliary tie-rod 27. The links 28 are pivotally connected at both ends with the bars 26 and rod 27, respectively.

The rod 27 is preferably rectangular in cross section and rests in supported relation upon the rod 17, being guided in the same groove as that provided in the plate 21 for the rod 17. The said rods are provided with edge-opening slots 29 and 30, respectively. The slots 29 and 30 are similar in size and shape, both being designed for receiving the locking pin 31 on a latch arm 32 when the said arm is swung on its pivot 33 to place said pin in said slots.

When the arm 32 and pin 31 carried thereby are disposed as above described and as best shown in Figs. 4 and 6 of the drawings, the rod 27 is controlled by, to move with, the rod 17. The rod 17 forming a part of the wheel-steering gear, is consequently operated with said gear. As a result of the above-described connection between the rods 17 and 27, the focal axes of the lamps 23 are maintained in substantially parallel relation to the wheels 15, the said lamps being turned on their pivot posts 24 in accord therewith.

When it is desired to maintain the lamps 23 in parallel relation to the body of the vehicle, this is accomplished by moving the latch arm 32 on its pivot 33, for moving the pin 31 out of the slots 29 and 30, and into the slot 34 in the plate 21. The plate 21 being stationary, the rod 27 is prevented from being moved by the rod 17. The arm 32 is shifted in the manner indicated, by a thrust bar 35, which is pivotally connected to the latch arm 32, and is adapted to swing therewith when said arm is moved to lock the rods 17 and 27 together. The opposite end of the bar 35 is extended through the dashboard 36 of the vehicle, an opening 37 being provided in said dashboard for this purpose. A handle 38 is formed on the end of the bar 35 within the dashboard 36, whereby said bar is manipulated. To lock the bar 35 in adjusted position, a series of teeth 39 are formed on the side of said bar, for engaging the edge of a stroke plate 40 mounted on the dashboard 36. This construction is best seen in Fig. 8 of the drawings.

*Operation.*—When a vehicle is equipped with a wheel-steering and lamp-steering gears constructed as above described and as shown in the accompanying drawings, the operation is as follows: During the day, or when it is desired the lamps 23 should remain rigid and parallel with the body of the vehicle, the wheel-steering gear is manipulated to place the wheels 15 in alinement with the center of the vehicle body. In this position, it will be found that the slots 29 and 30 register with the slot 34. The driver now grasping the handle 38 on the bar 35, thrusts the same forward to remove the pin 31 from engagement with the slots 29 and 30, to thereafter rest in the slot 34 of the plate 21. This having been accomplished, the teeth 39 are permitted to engage the plate 40, when thereafter the bar 35 and arm 32 connected therewith are held against movement. This attachment having been effected, the wheel-steering mechanism may be operated without interfering with the lamp-steering mechanism or being hindered thereby. When at night it is desired to couple the two steering mechanisms for operating in unison, the wheels 15 are again placed in alinement with the body of the vehicle for registering the slot 29 with the slots 30 and 34. The operator again grasps the handle 38 and after lifting the teeth 39 from engagement with the plate 40, draws inward the bar 35 until the arm 32 and pin 31 carried thereby have been arranged so that the pin 31 rests in the slots 29 and 30, thereafter holding the rods 17 and 27 in operative relation. The teeth 39 are again permitted to engage the plate 40 for permitting the disengagement of the pin 31 from the slots 29 and 30.

Claims:

1. A mechanism as characterized, comprising a plurality of tie rods, one operatively connected with a wheel-steering mechanism, and the other operatively connected with a lamp-steering mechanism, said rods being held in superposed relation; means for operatively engaging and disengaging said rods; and a guide plate fixedly mounted on the vehicle structure and providing a guide slot for said rods.

2. A mechanism as characterized, comprising a plurality of tie rods, one operatively connected with a wheel-steering mechanism, and the other operatively connected with a lamp-steering mechanism, said rods being held in superposed relation; a guide plate fixedly mounted on the vehicle structure and providing a guide slot for said rods; means for operatively engaging and disengaging said rods; and a latch arm mounted on the rod connected with the lamp-steering mechanism adapted to engage said plate to be held in fixed relation thereby.

3. A mechanism as characterized, comprising a plurality of superposed connecting rods, one of said rods being incorporated in the wheel-steering mechanism of a vehicle, and the other of said rods being incorporated in the lamp-steering mechanism of the vehicle, both of said rods being provided with edge-opening slots, said slots being disposed to register; a supporting guide plate for said rods, said plate being fixedly mounted on the frame of the vehicle and having a slot therein arranged to register with the slots in said rods when said wheels and lamps are in parallel relation with the center of said vehicle; a latch arm pivotally mounted on the rod incorporated in the lamp-steering mechanism having a pin for engaging all of said slots; and means for selectively disposing said arm for engaging certain of said slots.

4. A mechanism as characterized, comprising a plurality of superposed connecting rods, one of said rods being incorporated in the wheel-steering mechanism of a vehicle, and the other of said rods being incorporated in the lamp-steering mechanism of the vehicle, both of said rods being provided with edge-opening slots, said slots being disposed to register; a supporting guide plate for said rods, said plate being fixedly mounted on the frame of the vehicle and having a slot therein arranged to register with the slots in said rods when said wheels and lamps are in parallel relation with the center of said vehicle; a latch arm pivotally mounted on the rod incorporated in the lamp-steering mechanism having a pin for engaging all of said slots; and a manually operable thrust bar for shifting said latch arm, said bar having a handle adjacent the driving station in said vehicle.

GEORGE WASHINGTON RICE.

Witnesses:
R. H. TEEPLE,
P. A. FLETCHER.